United States Patent [19]
Frippiat et al.

[11] Patent Number: 6,010,735
[45] Date of Patent: Jan. 4, 2000

[54] HYDRATED LIPOPHILIC COMPOSITION AND PROCESS FOR PRODUCING IT

[75] Inventors: Anne Frippiat, Sterrebeek; Johan De Soete, Bierbeek; Georges Smits, Gijzegem-Aalst, all of Belgium; Thomas Keme, Aarau, Switzerland

[73] Assignee: Raffinerie Tirlemontoise, Belgium

[21] Appl. No.: 09/128,945

[22] Filed: Aug. 5, 1998

Related U.S. Application Data

[62] Continuation-in-part of application No. 08/887,451, Jul. 2, 1997, abandoned, which is a continuation of application No. 08/616,955, Mar. 15, 1996, abandoned, which is a continuation of application No. 08/211,518, filed as application No. PCT/BE92/00043, Oct. 2, 1992, abandoned.

[30] Foreign Application Priority Data

Apr. 10, 1991 [BE] Belgium ................................. 9100914
Apr. 28, 1992 [BE] Belgium ................................. 9200389

[51] Int. Cl.$^7$ ..................................................... A23L 1/05
[52] U.S. Cl. ......................... 426/601; 426/573; 426/658; 426/660
[58] Field of Search ..................................... 426/570, 602, 426/577, 578, 579, 660, 573, 658, 601

[56] References Cited

U.S. PATENT DOCUMENTS 5,169,671  12/1992  Harada ..................................... 426/565
5,527,556  6/1996  Frippiat ................................... 426/573

OTHER PUBLICATIONS

Minifie 1980 Chocolate, Cocoa and Confectionery: Science and Technology 2nd edition AVI Publishing Co Inc Westport CT p. 71, 75, 132, 133.

*Primary Examiner*—Carolyn Paden
*Attorney, Agent, or Firm*—Hayes Soloway Hennessey Grossman & Hage PC

[57] ABSTRACT

The present invention is related to a lipophilic composition which is made of: a) as the principal lipophilic ingredient, a chocolate mass or a chocolate substitute mass which does not contain water continuous phase, and b) an aqueous ingredient containing between 25 and 90% water, wherein the water is immobilized in a gel obtained from an element selected from the group consisting of an edible carbohydrate with gelling properties, a pectin with gelling properties or a mixture thereof, and wherein the aqueous ingredient is substantially uniformly and homogeneously dispersed in the principal lipophilic ingredient and wherein the lipophilic composition has a softening temperature higher than 28° C.

8 Claims, No Drawings

HYDRATED LIPOPHILIC COMPOSITION AND PROCESS FOR PRODUCING IT

This application is a continuation-in-part of application Ser. No. 08/887,451 filed Jul. 2, 1997 now abandoned, which was a continuation of application Ser. No. 08/616,955 filed Mar. 15, 1996 now abandoned, which was a continuation of application Ser. No. 08/211,518 filed Jul. 19, 1994 now abandoned, which was the US national stage of International Application No. PCT/BE92/00043 filed Oct. 2, 1992.

OBJECT OF THE INVENTION

The present invention relates to a hydrated lipophilic composition.

The object of the invention also relates to the process for the preparation of the composition according to the invention.

TECHNOLOGICAL BACKGROUND FORMING THE BASIS OF THE INVENTION

Chocolate normally consists of fatty substances of hydrophobic and lipophilic character such as cocoa butter (mixture of stearyl-, oleyl-, palmityl-, and linoleyl-triglyceride), containing in dispersion non-fatty substances, such as cocoa extracts (cellulose fibers, flavorings, theobromine and the like), sugars, proteins (especially proteins derived from milk).

Other ingredients may also be present in chocolate, such as for example fruits, almonds, nuts, special flavorings, liqueurs, substitutes for sugar and/or fats, and the like).

The principal chocolate phase has a lipophilic character and generally a fairly low melting point. Because of the lipophilic character of the chocolate phase it has up until now been a general rule to use as few water-containing components as possible in chocolate-based products.

Likewise, the flavoring components used such as cream powder or powdered fruit juices do not contain water or contain as little water as possible.

Consequently, it is the general practice to evaporate the water during quenching and to reduce the water content down to about 1% by weight or less.

Likewise, it has always been the practice to suppress the waiter in chocolate in order to improve the production characteristics, the sensation of taste, the flavor and generally, the organoleptic properties of the chocolate.

Thus, Patent JP 52/12267 describes the prior coating of saccharides which contain water or are hygroscopic, such as glucose or fructose, with lipophilic sucrose esters in order to prevent their hygroscopic character and consequently the increase in the water content of the chocolate.

Cocoa butter starts to soften at 28° C. and the chocolate mass loses its consistency and its shape. The mass no longer breaks sharply, it can no longer maintain its shape and sticks to the packaging and to the fingers. The softening temperature (28° C.) of normal chocolate constitutes a great disadvantage for its general use in regions having a hot climate.

It is well known that by homogeneously mixing water, even in a small quantity, with chocolate, some physical properties, such as the behavior under conditions of high temperature, can be modified.

Nevertheless, this cannot be achieved by a mere addition of water to the lipophilic phase, even with mixing, given the incompatibility between the two phases. The water causes an extremely rapid local thickening of the lipophilic ingredient, which gives rise to the formation of lumps and to a serious deterioration of the usability and of the texture of the chocolate.

PRIOR STATE OF THE ART

In order to overcome these disadvantages, a number of research studies on chocolate withstanding high temperatures has been undertaken.

One of the solutions proposed consists in the selection of fats with a higher melting point. Nevertheless, with this process, the chocolate gives a waxy sensation in the mouth.

Other solutions consist in interrupting the continuity of the fatty phase in the chocolate in order to minimize the effects resulting from the melting of the said phase on the loss of the properties of the chocolate. This interruption can be achieved either by incorporating the fatty phase into components of higher melting point (phase inversion), or by forming, inside the mass, a network of higher melting point by means of solid products, other than oils or fats, which enclose the fatty phase in this structure.

Patent CH-409603 describes the direct incorporation of about 5% water by weight into chocolate during production. The melted mass thickens so quickly that it is impossible to pour the liquid into molds. The composition should be ground into a powder which is then sintered, under pressure, in molds.

U.S. Pat. No. 2,760,867 describes the use of a known emulsifier such as lecithin, for incorporating water into chocolate. The use of lecithin in a large quantity gives rise to problems of flavor.

Patent CH-410,607 describes a composition for chocolate containing hydrophilic substances such as dextrose, maltose, invert sugar, fructose, sorbitol and the like. The chocolate items cast with this composition are subjected to a, moist atmosphere where they absorb a quantity of water, thus improving the chocolate heat resistance.

In patents CH-399,691 and CH-469,211, the incorporation, during production, of amorphous sugar into the chocolate composition is described.

These sugars, during the absorption of water, participate in the construction of a branched structure which prevents the mass from collapsing when the temperature exceeds the melting temperature of the fats used for the manufacture of the chocolate.

In U.S. Pat. No. 4,081,559, a quantity of sugar is added to the chocolate so that when the water is finally added, an aqueous solution of sugar is produced containing fats which can be consumed in emulsion.

According to Japanese Patent JP 59/156246, chocolate containing a small quantity of water (1.5 to 5%) is produced by mixing the chocolate with hydrated ingredients such as glucose syrup, sucrose, invert sugar, starch, honey, sorbitol and the like, The fats can also be incorporated in the form of microcapsules of less than 2 microns, formed from a membrane which is edible and insoluble in the lipids (Patent CH-519, 658).

According to Patent FR 2,318,589, a chocolate composition resistant to any temperature up to 65 can be prepared by carrying out the following operations: in the composition containing 15 to 35% by weight of an edible fat, and at least 40% by weight of sugar, emulsification is carried out with a quantity of water sufficient to obtain 100% by weight, Then the water is evaporated until the aqueous and fatty phases separate, in order to obtain an edible composition in which the moisture content is not greater than 5% by weight and in which each individual fat globule is incorporated into amorphous sugar (sugar glass).

In U.S. Pat. No. 4,446,166, water is first emulsified in a solid fatty phase, followed by milling of this emulsion into a powder of very fine particles and the dispersion of these particles in a melted chocolate mass. Since the solid phase coating the water has a sufficient thermal inertia, it is possible, by this technique, to homogeneously distribute the water, incorporated into the fat, in the mass of liquid chocolate before the melting of the encapsulating fat and therefore before the retained water is liberated from the particles.

A disadvantage of this method is that the chocolate mass treated in this manner should be prepared with less fat than normally because the remainder of the fat is added in the form of a powdered solid water emulsion, which could cause undesirable production problems.

Patent EP-297,054 describes a process by which a foam of fine bubbles of air or of gas in water is mixed with a liquid mass having a lipophilic character, such as a chocolate mass, which is later left to cool.

Preferably, the mass is stabilized by the addition of an amphiphatic foam stabilizer.

The air or gas enclosed is then removed from the mixture for the casting, by subjecting the mixture to a reduced pressure or by pressing it mechanically.

Patent BP-427,544 describes the production of a stable water-in-oil emulsion by mixing the chocolate with an appropriate quantity of water in the presence of a nut paste or of a sugar fatty ester having a low hydrophilic-lipophilic balance. Furthermore, one or more conventional emulsifying agents can be used such as lecithin, fatty acid esters, glycol or glycerin.

According to Patent EP-393327, a heat-resistant chocolate is produced by mixing the basic products for chocolate with a water-in-oil emulsion formed by emulsification in the presence of an emulsifying agent of an oil phase and a water phase in which a hydrophilic product such as for example sugar, fruit sugar, malt sugar and the like, is contained. A skeleton forms gradually with the solids, other than the oils or fats. After storage for days at 18° C., the chocolate would preserve its shape in atmospheres of 40 and 50° C.

Patent JP 60/027339 describes the preparation of a chocolate with a high water content by adding to the chocolate a water-in-oil emulsion formed by an oil component, a component containing a lot of water and an emulsifying agent having a specific lipophilic character.

According to Patent JP 03/053847, a chocolate having a high water content is prepared by adding constituents containing a lot of water to a chocolate base, which contains lipophilic polyesters of sucrose and unsaturated fatty acids.

Patent JP 57/115140 describes a chocolate composition, resistant to heat, which contains particles which form a water-in-oil emulsion in which at least a portion comprises solidified fatty acids.

From this description of the prior state of the art, it is clear that a lot of techniques have been proposed for the incorporation of water into chocolate with the aim of improving its properties in hot climates. But since the addition of water leads to an extremely rapid thickening of the lipophilic mass, it is found to be practically impossible to distribute this water in the chocolate very finely and homogeneously.

The consequence of this is that this type of hydrated chocolate has a grainy texture and a rough sensation in the mouth.

Furthermore, its structure gives a crispy and fragile sensation in the mouth. In addition, in a lot of cases, an additional step is required during the production, which negatively influences the productivity.

AIM OF THE INVENTION

The objective of the present invention is to provide a hydrated lipophilic composition such as chocolate while minimizing the disadvantages of the above-mentioned prior state of the art.

An additional aim of the present invention consists in providing a heat-resistant chocolate, which gives a mild melting feel in the mouth, a mild sensation in the mouth and which has a quality equivalent to good chocolate while maintaining its form at a temperature above 40° C., or even at a temperature of 55 to 75° C. and which does not stick to the hands.

CHARACTERISTIC FEATURES OF THE INVENTION

The invention relates to a hydrated lipophilic composition comprising
a) as the principal phase, a lipophilic ingredient such as a chocolate mass or a chocolate substitute mass, which does not contain a water continuous phase, and
b) an aqueous ingredient wherein the water is immobilized.

Advantageously, the aqueous ingredient comprises tore than 20% water, more preferably between 25 and 90% water.

According to the invention, the water is immobilized in at gel made of an element selected from the group consisting of an edible carbohydrate with gelling properties, a pectin with gelling properties and a mixture thereof. Said aqueous ingredient is substantially uniformly and homogeneously dispersed in said principal lipophilic ingredient and said lipophilic composition has a softening temperature higher than about 28° C.

In the present invention, the aqueous ingredient comprises water or an aqueous composition and is preferably selected from the group consisting of water, crème fraîche, juice, liquor, natural honey, milk, liquid sugar, flavorings, wine, coffee, and mixtures thereof.

For non-food purposes, other aqueous ingredients in which the water is the principal phase can be used.

The present invention also relates to a process for the preparation of an hydrated chocolate composition comprising the steps of mixing the principal lipophilic ingredient of said lipophilic composition (preferably a chocolate mass or a chocolate substitute mass) which does not contain a water continuous phase, with an aqueous ingredient comprising advantageously more than 20%, more preferably between 25 and 90% water, and wherein the water is immobilized, preferably in a gel made of an element selected from the group consisting of an edible carbohydrate with gelling properties, a pectin with gelling properties and mixtures thereof.

In said process, the aqueous ingredient is substantially uniformly and homogeneously dispersed in said principal lipophilic ingredient and the lipophilic composition has a softening temperature higher than about 28° C.

It is of course understood that any method by which water is captured and immobilized can be used.

Advantageously, chocolate with reduced calories can be, obtained by incorporation of water. Likewise, this method of incorporation of water can be also combined with the use of substitutes for sugar and/or fats in order to obtain chocolate with highly reduced calories.

Therefore, the hydrated lipophilic composition according to the invention is advantageously a chocolate bar, a dark, a milk or a white chocolate bar which will retain its initial shape and its organoleptic properties, which does not melt or stuck to the thumb, even at a temperature above 28° C., even at a temperature of 40° C., or at a temperature above 40° C., such as a temperature of 55 to 75° C.

DESCRIPTION OF A PREFERRED EMBODIMENT OF THE PRESENT INVENTION

In order to solve the problem associated with the uniform and homogeneous incorporation of water or aqueous ingredients into an ingredient with lipophilic character, the applicant initiated detailed research studies which resulted in the development of a process which is easy to carry out.

This aqueous ingredient may be water or an aqueous composition such as cream, milk, juice, liqueur, liquid sugars, natural honey and the like, or other flavorings containing a lot of water such as wine, coffee or any combination thereof.

In the remainder of the description, the term "water" refers both to the water itself and to any aqueous ingredient.

During the introduction of water into a lipophilic ingredient, it is absolutely necessary that the water does not enter directly into contact with the lipophilic ingredient before being homogeneously distributed in this ingredient. Attempts should therefore be made to delay as much as possible this coming into contact between the water and the lipophilic ingredient.

The applicant has found that by immobilizing the water or the aqueous ingredient, it could be uniformly and homogeneously mixed with a lipophilic ingredient without any deterioration of the properties of the latter.

The water is immobilized by capturing it in a three-dimensional structure, such as a gel.

In the literature, there are many definitions of gel: there may be mentioned for example a very brief definition on page 204 of "Advances in Food and Nutrition Research", "Vol. 34, Eds J. E. Kinsel, Academic Press, 1990": "Gel may be defined by the ability to immobilize a liquid". On page 205 of this same book, the classification of gels into four types is given on the basis of structural criteria.

In the introduction to the chapter "On the fractal nature of Particle gels", on page 369 of the book "Food Polymers, Gels and colloids", Ed. E. Dickinson, Special Publication No. 82 of the Royal Society of Chemistry", another definition, which also occurs in the preceding book on pages 204 and 205, reads: "a gel is a continuous three-dimensional network of molecules or particles connected in a continuous liquid phase".

In the second paragraph of page 369, the authors describe that: "most researchers think mainly that a gel network consists of long and flexible macromolecules which are branched at certain points, either by covalent bonds, or by microcrystalline domains, or by entanglement, or by other bonds. There are, nevertheless, other types of gel: fairly small amphiphilic molecules can associate in order to form a three-dimensional structure around a liquid solution. The suspended particles can also aggregate and form a rather irregular continuous network".

A characteristic of all the gels is that they have the appearance of a solid and that in spite of that there is a high water activity, indicating that the water is unbound or free.

This water does not flow from the gel even when the gel is cut.

In general, it could be said that any structure which immobilizes the water is suitable for the homogeneous incorporation of the water into ingredients with lipophilic character.

All products capable of immobilizing the water, either by forming a gel, or by any other means, are suitable.

However, since chocolate is a product for human consumption, only edible products such as carbohydrates with gelling properties or pectins were tested. As carbohydrate, the applicant used fructans such as inulin, potato flour such as Lycadex 100® from the firm Rocquette et Frères or Paselli SA2® from the firm Avebe or corn starch such as Stellar® from the firm Staley. As example of pectin, Splendid® from the firm Hercules Inc was used. Other useful carbohydrates include modified inulin, modified potato starch, modified corn starch, wheat starch, rice starch, cassava starch, modified cassava starch, gum arabic and mixtures thereof.

The preparation of the gels is made according to the indications of the producers of these products, except for the inulin gel (inulin cream) which was prepared according to the description of Belgian Patent Application 09,100,914, of Oct. 4, 1991 in the name of the applicant.

This addition of these gels to the ingredient with lipophilic character is made by simply mixing with moderate stirring. The chocolate mass is a typical example of an ingredient with lipophilic character.

It is evident that as chocolate mass, any type of chocolate can be used, both normal chocolate and chocolate with reduced sugar content or with reduced fat content or even with reduced sugar and fat content.

By chocolate, there should be understood both milk chocolate and dark chocolate or white chocolate or any other chocolate based on them.

The mixing of the immobilized water with the chocolate mass call be performed before or after tempering. The following examples are intended as illustration and do not in any way limit the scope of the present invention.

For simplicity, normal chocolate was taken and melted followed by a tempering phase like in the normal production of chocolate.

It is evident that when chocolate is manufactured by an individual, the same chocolate is obtained by adding immobilized water before or after tempering.

EXAMPLE 1

Chocolate-Containing Inulin Cream

The inulin cream is mixed with normal chocolate in order to obtain a uniform and homogeneous distribution of the water in the chocolate mass, without obtaining the disadvantages described in the prior state of the art. The chocolate thus obtained has the appearance of normal chocolate and has the same organoleptic properties as normal chocolate.
Composition (% By Weight)
Milk chocolate: 95
Inulin cream (50% d.m.—dry matter): 5
Process
Polar 250 ml of water at room temperature into a beaker and place an Ultra-Turrax® T25 from the firm Jenke & Kunkel Co in the beaker. Add 250 g of inulin in small quantities, in order to avoid the formation of lumps, while the Ultra-Turrax® turns at full speed. After the complete addition of the inulin, continue the shearing for 2 to 3 minutes. The cream already begins to form during the operation.

Melt the normal milk chocolate in an oven at 45° C. Temper the chocolate in order to obtain a good fluidity for molding. For this purpose, leave the chocolate to cool to 25° C. while stirring and heat the chocolate to 27° C.

Add the inulin cream to tile tempered chocolate. Mix the chocolate in order to obtain a homogeneous mass. Cast the chocolate into molds. Shake the molds and leave to cool. Remove the chocolate, which contains about 2.5% water, from the molds and package.

It is of course possible to work with other inulin concentrations in the cream. The inulin concentration in the cream may vary from 10 to 75% by weight, according to the type of inulin used.

More particularly, we have prepared creams having inulin concentrations by weight of 30, 35, 40, 45, 50 and 55%. All these inulin creams have given rise to chocolates having organoleptic properties equivalent to normal chocolate, or which are at least very acceptable.

The method of preparing the cream has no influence on the quality of the chocolate obtained.

Furthermore, the concentration of the cream in the chocolate can be varied. By taking for example a cream at 50% by weight of inulin, the concentration of this cream can be varied from 0.1 to 20% by weight in the chocolate. In Table No. 1 below, some results are presented which were obtained by varying the concentrations of inulin in the cream and of cream in the chocolate mass.

TABLE 1

Variations of the concentrations of inulin in the cream and of cream in the chocolate mass

| Type of chocolate mass | Concentration in inulin in the cream (% by weight) | Concentration of cream in the chocolate mass (% by weight) | Water content of the chocolate (% by weight) |
| --- | --- | --- | --- |
| milk | 40 | 8 | 4.8 |
| dark | 50 | 7 | 3.5 |
| white | 50 | 5 | 2.5 |
| milk | 55 | 18 | 8.1 |
| dark | 50 | 10 | 5 |
| white | 50 | 8 | 4 |
| milk | 35 | 6 | 3.9 |
| milk | 30 | 4 | 2.8 |
| dark | 45 | 10 | 5.5 |
| milk | 50 | 12 | 6 |

For the dark chocolate of Table 1, the temperatures for tempering are 27 and 29° C. respectively.

In all these cases, a chocolate mass is obtained which has a good viscosity for molding. All the chocolates obtained have a good appearance and give a mild melting feel in the mouth and a mild sensation in the mouth. They have organoleptic properties which are equivalent to those of the usual good chocolate, while retaining their shape at temperatures above 40° C., or even at temperatures of 55° C. and 75° C., and do not stick when touched.

When the melting and solidification process was repeated several times on the hydrated chocolate, it was not possible to detect separation of the ingredients, or dispersions of the fat on the surface of the chocolate tablet.

EXAMPLE 2

Milk Chocolate Containing a Gel Based on Potato Flour. (Paselli SA2® or Lycadex® 100)
Composition (% By Weight)
Milk chocolate: 95.3
Potato flour gel (25% d.m.): 4.7
Process Heat 250 ml of water to 50° C. Add 83 g of potato flour to the water. Heat the mixture up to 100° C. Pour the mixture into a beaker. Place an Ultra-Turrax® T25 from Jenke & Kunkel Co in the beaker and make it turn at full speed for two) to three minutes. Place the mixture overnight in a refrigerator. A gel containing about 25% by weight of dry matter is thus obtained, Melt the normal milk chocolate in an oven at 45° C. Temper the chocolate in order to obtain a good fluidity for molding. For this purpose, leave the chocolate to cool to 25° C. while stirring and heat the chocolate to 27° C.

Add the gel based on modified potato flour to the tempered chocolate. Mix the chocolate in order to obtain a homogeneous mass. Cast the chocolate into molds. Shake the molds and leave to cool. Remove the chocolate, which contains about 3.5% water, from the molds and package.

This increase in the viscosity of the melted chocolate being limited, the molding can be performed very easily. The chocolate thus obtained has excellent organoleptic properties.

EXAMPLE 3

Milk Chocolate Containing Modified Corn Starch (Stellar®)
Composition (% By Weight)
Milk chocolate 94.6
Gel of modified corn starch (35% d.m.) 5.4
Process Pour 250 ml of water at room temperature into a beaker and place an Ultra-Turrax® T25 from the firm Jenke & Kunkel Co in the beaker.

Add 134.6 g of corn starch. Make the Ultra-Turrax® turn at full speed for 2 to 3 minutes. A cream containing 35% dry matter is thus obtained.

Melt the normal milk chocolate in an oven at 45° C. Temper the chocolate in order to obtain a good fluidity for molding. For this purpose, leave the chocolate to cool to 25° C. while stirring and heat the chocolate to 27° C.

Add the cream of modified corn starch to the tempered chocolate. Stir the chocolate in order to obtain a homogeneous mass. Cast the chocolate into molds. Shake the molds and leave to cool. Remove the chocolate, which contains about 3.5% water, from the molds and package.

The hydrated chocolate of the example and a normal chocolate were subjected to an experienced taste panel who were not able to find substantial organoleptic differences between the two types of chocolate.

EXAMPLE 4

Milk Chocolate Containing a Splendid® Gel
Composition (% By Weight)
Milk chocolate: 96.3
Splendid® Gel: 3.7
Process Mix in the dry state 3.7 g of Splendid® and 0.25 g of Genu Pectin type BB Rapid Set, also from the firm Hercules Inc. Take a portion of the 95.6 ml of water in order to dissolve 0.4 g of calcium chloride dihydrate. Dissolve the Splendid® and the Genu Pectin by means of a high speed mixer in the remainder of the water. Add the calcium chloride solution while stirring rapidly. Continue the stirring until this mixture resembles an apple sauce.

Melt the normal milk chocolate in an oven at 45° C. Temper the chocolate in order to obtain a good fluidity for molding. For this purpose, leave the chocolate to cool to 25° C. while stirring and heat the chocolate to 27° C.

Add the Splendid® gel to the tempered chocolate. Mix the chocolate in order to obtain a homogeneous mass. Cast the chocolate into molds. Shake the molds and leave to cool. Remove the chocolate, which contains about 3.5% water, from the molds and package.

EXAMPLE 5
Milk Chocolate Containing Crème Fraîche and Inulin
Composition (% By Weight)
Milk chocolate: 92
Cream paste: 8
Process Pour 250 ml of crème fraîche at room temperature into a beaker and place an Ultra-Turrax® T25 from the firm Jenke & Kunkel Co in the beaker. Add 167 g of inulin in small quantities, in order to avoid the formation of lumps, while the Ultra-Turrax® turns at full speed. After the complete addition of the inulin, continue the shearing for 2 two 3 minutes. A paste containing 60% crème fraîche and 40% inulin is obtained.

Melt the normal milk chocolate in an oven at 45° C. Temper the chocolate in order to obtain a good fluidity for molding. For this purpose, leave the chocolate to cool to 25° C. while stirring and heat the chocolate to 27° C.

Add the crème fraîche paste to the tempered chocolate. Mix the chocolate in order to obtain a homogeneous mass. Cast the chocolate into molds. Shake the molds and leave to cool. Remove the chocolate from the molds and package.

A chocolate with an excellent creamy taste is obtained, permitting easy molding. this chocolate does not melt in the hands.

EXAMPLE 6
Milk Chocolate Containing Gum Arabic
Composition (% By Weight)
Milk chocolate: 93
Gum arabic gel: 7
Process Heat to 100° C. 250 ml of water in a beaker. Add 250 g of gum arabic. Mix for 15 to 30 minutes until the mixture is homogeneous. Leave to rest so that the gel forms.

Melt the normal milk chocolate in an oven at 45° C. Temper the chocolate in order to obtain a good fluidity for molding. For this purpose, leave the chocolate to cool to 25° C. while stirring and heat the chocolate to 27° C.

Add the gum arabic gel to the tempered chocolate. Mix the chocolate in order to obtain a homogeneous mass. Cast the chocolate into molds. Shake the molds and leave to cool. Remove the chocolate, which contains about 3.5% water, from the molds and package.

Since the viscosity of the melted chocolate practically does not increase during the addition of the gel, this permits easy molding. The chocolate thus obtained has organoleptic properties equivalent to normal chocolate and does not melt in the hand.

EXAMPLE 7
Milk Chocolate Containing Inulin Cream
Composition (% By Weight)
Milk chocolate: 90
Inulin cream (50% d.m.): 10
Process Prepare the inulin cream according to Example 1. Melt the milk chocolate in an oven at 45° C. Add the inulin cream to the melted chocolate. Mix the chocolate in order to obtain a homogeneous mass. Temper the chocolate in order to obtain a good fluidity for molding. For this purpose, leave the chocolate to cool to 25° C. while stirring and heat the chocolate to 27° C. Cast the chocolate into molds. Shake the molds and leave to cool. Remove the chocolate, which contains about 5% water, from the molds and package.

The addition of the inulin cream to the chocolate mass can be performed both before tempering and after tempering (as described in Example 1). As clearly evident from the tasting trials, no difference was detected between the organoleptic properties of chocolate made according to Example 1 and according to this example.

EXAMPLE 8
Dark Chocolate Containing Fruit Juice
Composition (% By Weight)
Dark chocolate: 93
Cream with orange juice: 7
Process Pour 250 ml of orange juice at room temperature into a beaker and place an Ultra-Turrax® T25 from the firm Jenke & Kunkel Co in the beaker. Add 250 g of inulin in small quantities, in order to avoid the formation of lumps, while the Ultra-Turrax® turns at full speed. After the complete addition of the inulin, continue the shearing for 2 to 3 minutes.

Melt the normal dark chocolate in an oven at 45° C. Temper the chocolate in order to obtain a good fluidity for molding. For this purpose, leave the chocolate to cool to 27° C. while stirring and heat the chocolate to 29° C.

Add the inulin cream with orange juice to the tempered chocolate. Mix the chocolate in order to obtain a homogeneous mass. Cast the chocolate into molds. Shake the molds and leave to cool. Remove the chocolate, which contains about 3.5% water, from the molds and package.

A chocolate with excellent organoleptic properties, which does not melt in the hands and which can be very easily molded, is obtained.

As also demonstrated by Example 5, the immobilization of this water in the crème fraîche or in the fruit juice offers an effective method for introducing flavorings into lipophilic masses without having to remove the water beforehand.

EXAMPLE 9
Test for Resistance to a Heat of 40° C.

Chocolates from Examples 1, 2, 3, 4, 6 and 7 were placed with a standard milk chocolate in an oven at 40° C. After one hour, the standard chocolate lost its shape, whereas the other chocolates retain their shape. After six hours, the standard chocolate was completely fluid, whereas the chocolates from the various examples still possess their initial shape.

EXAMPLE 10
Test of Shelf Life

Chocolates prepared according to Examples 1 to 8 were placed in an acclimation cabinet at a temperature of 20° C. and a relative humidity of 65% for a period of 15 days. No change could be seen at the surface of the chocolates.

EXAMPLE 11
Thumb Pressure Test

The chocolates prepared according to Examples 1, 2, 3, 4, 6 and 7 were evaluated by pressing the thumb on the chocolate tablets for one minute. No chocolate melted or stuck to the thumb. The same test with a standard milk chocolate gave a melted and sticky surface.

EXAMPLE 12
A Chocolate Composition Comprising a Litesse® Solution or Polydextrose Solution A Litesse® solution (a polydextrose solution being a mixture of polyglucoses comprising 80% dry matter) are used in order to form an aqueous ingredient of high viscosity.

8.75% of said aqueous ingredient (comprising less than 20% water) are added to milk chocolate.

The total water concentration of the final product will be 1.75%.

8.75% of said aqueous ingredient (comprising less than 20% water) are added to milk chocolate.

The total water concentration of the final product will be 1.75%.

However, the Litesse® solution forming the aqueous ingredient is not easily and homogeneously dispersed in a chocolate composition for a chocolate bar, which will affect its preparation process. Furthermore, the texture of the final product is not equivalent to the organoleptic properties of a normal chocolate bar.

We claim:

1. Lipophilic composition which comprises
    a) as the principal lipophilic ingredient, a chocolate mass or a chocolate substitute mass which does not contain a water continuous phase, and
    b) an aqueous ingredient comprising between 25 and 90% water, wherein the water is immobilized in a gel obtained from an element selected from the group consisting of an edible carbohydrate with gelling properties, a pectin with gelling properties and a mixture thereof, and wherein said aqueous ingredient is substantially uniformly and homogeneously dispersed in said principal lipophilic ingredient and wherein the lipophilic composition has a softening temperature of higher than 28° C.

2. Composition according to claim 1, wherein the aqueous ingredient is selected from the group consisting of water, crème fraîche, juice, liqueur, natural honey, milk, liquid sugar, flavorings, wine, coffee, or a mixture thereof.

3. Composition according to claim 1, wherein the carbohydrates are selected from the group consisting of fructan, inulin, modified inulin, potato flour, modified potato flour, starch, modified potato starch, modified corn starch, wheat starch, rice starch, cassava starch, modified cassava starch, gum arabic and mixtures thereof.

4. Composition according to claim 1 wherein the lipophilic composition has a softening temperature of at least 40° C.

5. Process for the preparation of a hydrated lipophilic chocolate composition comprising mixing of the principal, lipophilic ingredient being a chocolate mass which does not contain a water continuous phase, with an aqueous ingredient comprising between 25 and 90% water wherein the water is immobilized in a gel made of an element selected from the group consisting of an edible carbohydrate with gelling properties, a pectin with gelling properties and mixtures thereof, wherein said aqueous ingredient is substantially uniformly and homogeneously dispersed in said principal, lipophilic ingredient and wherein the lipophilic composition has a softening temperature of higher than 28° C.

6. Process according to claim 5, wherein the aqueous ingredient is selected from the group consisting of water, crème fraîche, juice, liqueur, natural honey, milk, liquid sugar, flavorings, wine, coffee, or a mixture thereof.

7. Process according to claim 5, wherein the carbohydrates are selected from the group consisting of fructan, inulin, modified inulin, potato flour, modified potato flour, starch, modified potato starch, modified corn starch, wheat starch, rice starch, cassava starch, modified cassava starch, gum arabic and mixtures thereof.

8. Process according to claim 5, wherein the lipophilic composition has a softening temperature of at least 40° C.

* * * * *

UNITED STATES PATENT AND TRADEMARK OFFICE
CERTIFICATE OF CORRECTION

PATENT NO. : 6,010,735
DATED : January 4, 2000
INVENTOR(S) : Frippiat et al.

It is certified that error appears in the above-identified patent and that said Letters Patent is hereby corrected as shown below:

<u>Title page,</u>
Related U.S. Application Data should read as follows:
-- Continuation-in-part of application No. 08/887,451, Jul. 2, 1997, abandoned, which is a continuation of application No. 08/616,955, March 15, 1996, abandoned, which is a continuation of application No. 08/211,518, Jul. 19, 1994, filed as application No. PCT/BE92/00043, Oct. 2, 1992, abandoned. --

<u>Column 12, claim 5,</u>
Line 7, delete "of".

Signed and Sealed this

Twenty-sixth Day of February, 2002

Attest:

JAMES E. ROGAN
Attesting Officer  Director of the United States Patent and Trademark Office